United States Patent
Li

(10) Patent No.: US 7,260,144 B2
(45) Date of Patent: *Aug. 21, 2007

(54) ARCHITECTURE FOR PER TONE EQUALIZER WITH REDUCED COMPLEXITY FOR DMT-BASED XDSL MODEMS

(75) Inventor: Xiaohui Li, College Station, TX (US)

(73) Assignee: Texas Instruments Incorporated, Dallas, TX (US)

( * ) Notice: Subject to any disclaimer, the term of this patent is extended or adjusted under 35 U.S.C. 154(b) by 762 days.

This patent is subject to a terminal disclaimer.

(21) Appl. No.: 10/735,011

(22) Filed: Dec. 12, 2003

(65) Prior Publication Data

US 2005/0129100 A1  Jun. 16, 2005

(51) Int. Cl.
*H04B 1/38* (2006.01)
(52) U.S. Cl. .................................... 375/222
(58) Field of Classification Search ........... 375/222, 375/260, 348, 350, 341, 316; 370/478, 294; 379/93.01
See application file for complete search history.

(56) References Cited

U.S. PATENT DOCUMENTS

| 7,058,141 | B1* | 6/2006 | Nedic ................. | 375/341 |
| 2003/0091133 | A1* | 5/2003 | Redfern et al. ....... | 375/348 |
| 2004/0202259 | A1* | 10/2004 | Gross et al. .......... | 375/348 |

OTHER PUBLICATIONS

Van Acker, et al "Per Tone Equalization for DMT-Based System" IEEE Tran. Comm., vol. 49, No. 1 (Jan. 2001) pp. 109-119.*
Vanbleu, Koen et al; Adaptive Bitrate Maximizing TEQ Design for DMT-Based Systems; 2004 IEEE; pp. 1057-1060.
Ysebaert, Geert et al.; Combined RLS-LMS Initialization for Per Tone Equalizers in DMT-Receivers; 2003 IEEE; pp. 1916-1927.
Vanbleu, Koen et al.; Bitrate Maximizing Time-Domain Equalizer Design for DMT-Based Systems; 2003 IEEE; pp. 2360-2364.
Ysebaert, Geert et al.; Bit-Rate Maximizing Windows and Equalizer Design for DMT-Systems; pp. 1923-1926.
Van Acker, Katleen et al.; Per Tone Equalization for DMT-Based Systems; IEEE Transactions on Communications, vol. 49, No. 1, Jan. 2001; pp. 109-119.

\* cited by examiner

*Primary Examiner*—Khai Tran
(74) *Attorney, Agent, or Firm*—Steven A. Shaw; W. James Brady; Frederick J. Telecky, Jr.

(57) ABSTRACT

In accordance with an embodiment of the present invention an improved equalization system for DMT based modem receiver is provided. It includes a time domain equalizer for processing samples from an analog front end and includes a device for computing differences of time domain samples for every frame and the results are saved. An FFT is provided for calculating a first FFT and the results are saved in a FFT buffer so that at each DMT frame, after a difference and FFT operation, the FFT buffer contains the first FFT and v−1 time domain sample differences. A sliding FFT for each tone reads the first FFT result and v−1 FFTs and recursively computes the rest of v−1 FFTs for the particular tone. An equalizer is responsive to the computed sliding FFT for recursively computes equalizer outputs.

8 Claims, 1 Drawing Sheet

ARCHITECTURE FOR PER TONE EQUALIZER WITH REDUCED COMPLEXITY FOR DMT-BASED XDSL MODEMS

FIELD OF INVENTION

This invention relates to DMT-based xDSL Modems and more particularly to an improved architecture for per tone equalization with reduced complexity for DMT modems.

BACKGROUND OF INVENTION

Multi-tone modulation is the basis of the DMT version of ADSL as well as multi-carrier versions of VDSL. This type of modulation is sometimes called orthogonal frequency division multiplexing (ODFM). DMT has more than one encoder and each encoder receives a set of bits that are encoded using a constellation encoder. The output values are the cosine and sine waves and a different cosine and sine frequency is used for each constellation encoder. All the sine and cosine waves are summed together and sent over the channel. Equalization is done by adaptive filters to optimize or nearly optimize transmission. Anytime a channel's frequency response is not flat over the range of frequencies being transmitted inter symbol interference (ISI) occurs.

A per tone equalization for DMT-based systems has recently been proposed. See article by Katleen Van Acker, Geert Leus, Marc Moonen, Oliver van de Weil, and Thierry Pollet, "Per Tone Equalization for DMT Based Systems," IEEE Transactions Communications, vol. 49, No. 1 pp 109-119, January 2001. The method designs an optimum equalizer for each individual tone and has the potential of achieving an optimum design for DMT based modem systems. The method is summarized by the following.

The traditional DMT modem receiver is first formulated mathematically. To simplify the discussion, it is assumed that the time domain equalizer (TEQ) operates on DMT frames that are perfectly aligned and the length of TEQ and the size of the cyclic prefix are the same. The time domain equalizer removes inter symbol interference from the channel that is longer than the cyclic prefix. The cyclic prefix adds the last L sample points of the 512-point time-domain vector to the beginning of the vector. The interference would otherwise cause a symbol to interfere with the next symbol in time. The time domain equalizer also is used to band pass filter the incoming signal and filter out the out-of-band energy. Let y represent a perfectly aligned DMT frame with cyclic prefix as follows:

$$y = [y_0, \ldots, y_1, \ldots, y_{N+v-2}, y_{N+v-1}], \quad (1)$$

where N is the size of regular DMT framed and v is the size of cyclic prefix. The standard receiver with time equalization (TEQ) can be represented as follows, $$\begin{bmatrix} z_1 \\ \vdots \\ z_N \end{bmatrix} = \begin{pmatrix} D_1 & 0 & \ldots \\ 0 & \ddots & 0 \\ \vdots & 0 & D_N \end{pmatrix} \cdot F_N * (Y * w_{teq}) \quad (2)$$

where $$Y = [y_{t,o} \; y_{t,1} \; \ldots \; y_{t,v-1}] = \begin{pmatrix} y_v & y_{v-1} & \ldots & y_1 \\ v_{v+1} & y_v & \ldots & y_2 \\ & & \ddots & \\ y_{N+v-1} & y_{N+v-2} & \ldots & y_N \end{pmatrix} \quad (3)$$

and $w_{teq} = [w_0 \; w_1 \; \ldots \; w_{v-1}]^T$ is real v-tap TEQ. $F_N$ is N×N Fast Fourier Transform (FFT) matrix., $D_i$ the complex 1-tap frequency equalization (FEQ) for tone i, and Y is an N×v Toepliz matrix which contains exactly the same received signal samples as vector y in equation (1). For a single tone, one can rewrite the equation (2) as:

$$Z_i = D_i * \text{row}_i(F_N) * (Y * w_{teq}) = \text{row}_i(F_N * Y) * w_{teq} * D_i = \text{row}_i(F_N * Y) w_{feq,i} \quad (4)$$

By putting $D_i$ to the right, one has $w_{teq} D_i = (w_{freq,i})_{v \times 1}$ which is a complex v-tap for tone i. The next step then is to allow each tone to have its own optimal v-tap complex frequency equalization (FEQ) as proposed in the cited Van Acker et al. reference.

A per tone equalizer needs to compute a series of Fast Fourier Transforms (FFTs) for each DMT frame as shown in equation (4). Because for each subsequent FFT its time domain samples is only one sample different from its previous FFT, only the very first FFT needs to be computed. The subsequent FFTs can be efficiently calculated by sliding FFT as discussed in the cited Van Acker et al. reference.

Because each tone has its own equalizer, each filter can be optimally designed using minimum mean squared estimation (MMSE) method which is known in the art. The DMT receiver based on per tone equalizer has the potential to achieve optimum performance. Simulation results show that it outperforms almost all the time equalization (TEQ) design algorithms.

Although a per tone equalizer as proposed by the cited Van Acker et al. reference can potentially achieve optimum equalization performance, it is very complex to implement. Each equalizer is a multi-tap complex filter. It demands both high computational complexity and consumes a large amount of data memory.

SUMMARY OF INVENTION

In accordance with one embodiment of the present invention a new architecture uses a filter with real coefficients for each tone in stead of the complex filter.

In accordance with an embodiment of the present invention an improvement is provided by combining a time domain equalizer with a newly proposed per tone equalizer with real coefficients is used for each tone.

In accordance with an embodiment of the present invention a new per tone equalizer with real coefficients is provided by a real multi-tap frequency domain equalizer and a 1-tap complex frequency domain equalizer wherein the multi-tap equalizer operates on v number of FFT outputs for each individual tone.

In accordance with an embodiment of the present invention an improved equalization system for DMT based modem receiver includes a time domain equalizer for processing samples from an analog front end, a device for computing differences of time domain samples for every frame and saving the results. It includes an FFT for calculating a first FFT and the results are saved in a FFT buffer so that at each DMT frame, after a difference and FFT operation, the FFT buffer contains the first FFT and v−1 time domain sample differences. A sliding FFT for each tone reads the first FFT result and v−1 FFTs and recursively computes the rest of the v−1 FFTs for the particular tone. An equalizer is responsive to the computed sliding FFT output for recursively computing equalizer outputs.

DESCRIPTION OF PREFERRED EMBODIMENTS

According to the present invention an improved equalization architecture is provided for DMT based modem receiver. Two key features are provided. Firstly, the traditional time domain equalizer is moved from time domain to frequency domain and assigns each tone with its own multi-tap equalizer. Each equalizer is designed optimally for each individual tone. Secondly, a time domain equalizer is used jointly with the per tone equalizer.

Referring back to the equation (4) discussed above, instead of combining the multi-tap time domain equalizer and 1-tap complex frequency domain equalizer into a complex multi-tap frequency domain equalizer, one can keep them separate as shown below, $$Z_i = D_i^* \text{row}_i(F_N)^*(Y^* w_{teq}) = D_i^* \text{row}_i(F_N^* Y)^* w_{teq}. \qquad (5)$$

It can be seen that instead of implementing a multi-tap complex frequency domain equalizer, one can implement a real multi-tap frequency domain equalizer and a 1-tap complex frequency domain equalizer. The multi-tap real equalizer operates on v number of FFT outputs for each individual tone. The key is to design optimum multi-tap real equalizer and the 1-tap complex frequency domain equalizer for each individual tone to achieve the optimum equalization performance for DMT based modem receiver. A method proposed to design optimum time domain equalizer for each tone is described by Koen Vanbleu et al. in a paper in ICC, 2003 entitled "Bitrate Maximizing Time-Domain Equalizer Design for DMT-based systems." Because the multi-tap equalizer is a real filter, the computational complexity for the filter portion of per tone equalizer is reduced by half both in terms of the computational complexity and the memory requirement.

Another improvement in the complexity is to combine the time domain equalizer with the newly proposed per tone equalizer into a joint implementation of time domain equalizer and per tone equalizer. The concept is to utilize the time domain equalizer to cancel most of the inter symbol interferences (ISI) and use per tone equalizer to cancel the residue ISIs. Because the time equalizer (TEQ) does most of the equalization, the requirement for per tone equalizer is reduced, thus a less complex per tone equalizer is required.

Figure 1:
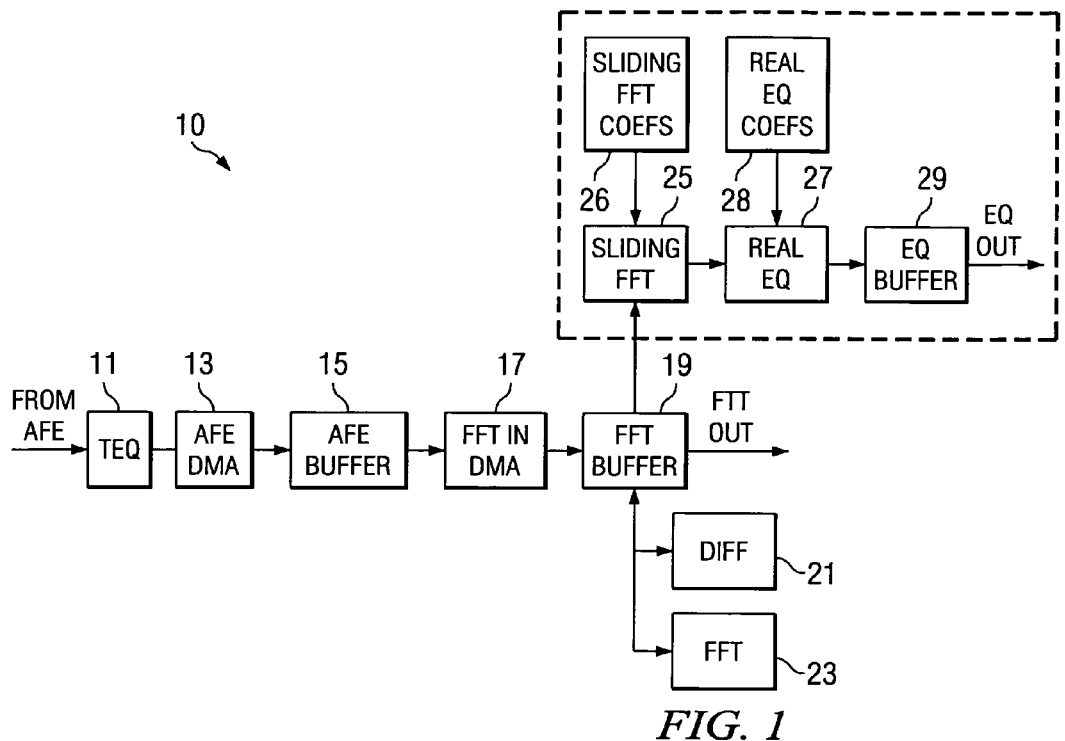
FIG. 1 is a block diagram for DMT modem with per tone equalizer.

FIG. 1 illustrates a block diagram of the DMT modem receiver 10 with per tone equalizer for the joint equalization. The block diagram mainly contains the blocks for time domain equalization (TEQ), FFT, and per tone equalizer as they are the main blocks with major changes. The block encircled by the doted line implements per tone equalizer that contains the equalizer with real coefficients. How efficiently it is implemented determines the efficiency of the overall architecture.

In the receiver 10, samples from the analog front end (AFE) are first processed by the time equalizer (TEQ block) 11. The outputs of the time equalizer TEQ 11 are then transferred to AFE buffer 15 by AFE direct memory access (DMA) controller 13. FFT input DMA controller (FFT IN DMA) 17 is responsible to transfer samples of every DMT frame from AFE buffer 15 to FFT buffer 19. The frame alignment is achieved by controlling the read pointer of FFT IN DMA controller 17.

At the completion of FFT IN DMA controller 17 transfer, the FFT buffer 19 contains one frame of samples including the cyclic prefix. For every frame in FFT buffer 19, the DIFF block 21 first computes differences of time domain samples, $y_{t,m}(0) - y_{t,m-1}(N-1)$ for m=1, ..., v−1, and saves the results in FFT buffer 19 at the location of the cyclic prefix. The sample differences are used for computing sliding FFT for the input of per tone equalizer. Then FFT block 23 calculates the first FFT required for computing sliding FFT and saves the result in FFT buffer 19. So basically, at each DMT frame after DIFF block 21 and FFT block 23 operation, the FFT buffer 19 contains the first FFT and v−1 time domain sample differences. Those are the inputs for computing sliding FFT and per tone equalizer operation.

For each tone, sliding FFT block 25 reads the first FFT result and v−1 sample differences from FFT buffer and recursively computes the rest of v−1 FFTs for the particular tone. The sliding FFT coefficients are provided by block 26. After each iteration, sliding FFT block 25 feeds the new FFT result to the real equalizer (EQ) block 27 and the EQ block 27 recursively computes equalizer output using the real equalization coefficients. The real equalizer coefficients are provided by block 28. The EQ block 27 writes the final outputs to the equalizer (EQ) buffer 29. The two blocks repeat the same procedure for all the tones that carry bits. The key here is to realize that each intermediate FFT results are only needed for conducting the particular stage equalizer operation and computing the sliding FFT for the next stage. By configuring the operation as recursive computation, only the final equalization results need to be saved. Thus the memory requirement is significantly reduced.

Figure 2:
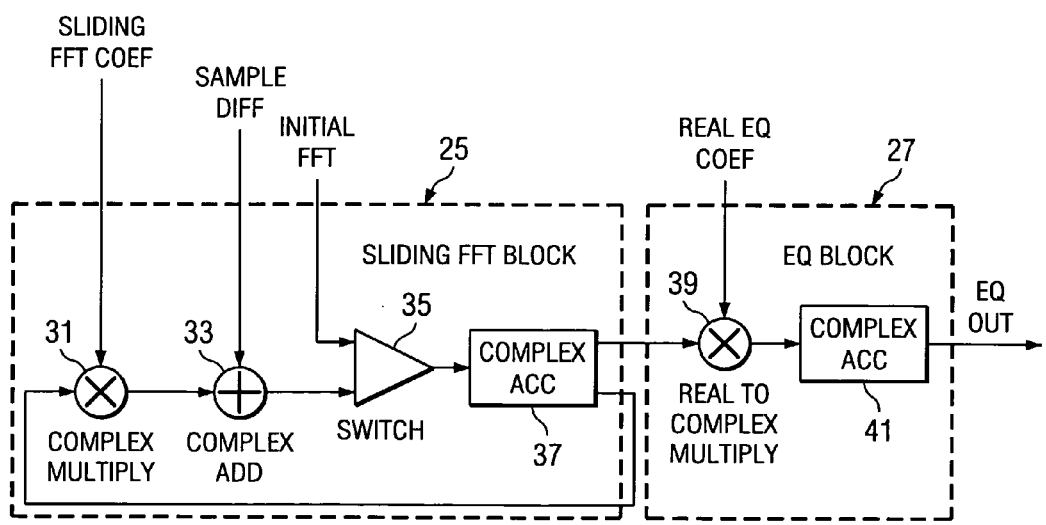
FIG. 2 is a block diagram of sliding FFT and per tone equalizer blocks.

FIG. 2 illustrates the basic block diagram for implementing sliding FFT 25 and per tone equalizer 27. The sliding FFT block 25 basically consists of a complex multiplier with complex multiply 31, complex add 33 and switch 35 and a complex accumulator 37. The EQ block 27 consists of a real-to-complex multiplier 39 and a complex accumulator 41. The output from the complex accumulate is multiplied at the real-to-complex multiplier 39 by the real equalizer coefficients and the result applied to the complex accumulator 41. Because the real per tone equalizer filters are used here, the complexity for the filtering block is reduced significantly. For each tone, each block recursively calculates v times to achieve final equalizer output for each tone. It repeats the same procedure for all the tones to compute the equalizer outputs.

The real multi-tap equalization filter reduces the complexity significantly over the original equalizer proposed by Katleen Van Acker et al. reference. The combination of time domain equalizer and per tone equalizer makes it realistically possible to achieve high equalization performance with modest complexity.

Although the invention has been illustrated and described with respect to exemplary embodiment thereof, it should be understood by those skilled in the art that the foregoing and various other changes, omissions and additions may be made without departing from the spirit and scope of the present invention.

The invention claimed is:

1. An improved equalization system for DMT based modem receiver comprising:
- a time domain equalizer for processing samples from an analog front end;
- means for transferring samples of every DMT frame from said time domain equalizer to a Fast Fourier Transform (FFT) buffer;
- means for computing differences of time domain samples for every frame into the FFT buffer and saving the results in the FFT buffer;
- a first FFT for calculating the first FFT and saving the results in said FFT buffer so that at each DMT frame, after a difference and FFT operation, the FFT buffer contains the first FFT and v−1 time domain sample differences;
- a sliding FFT that for each tone reads the first FFT result and v−1 FFTs from FFT buffer and recursively computes the rest of v−1 FFTs for the particular tone; and
- an equalizer responsive to the computed sliding FFT for computing equalizer outputs.

2. The system of claim 1 wherein said equalizer recursively computes the equalizer output and writes the final outputs to the FFT buffer.

3. The system of claim 2 wherein said sliding FFT and equalizer repeats the computing FFT operation and per tone equalization for all tones that carry bits and only using each intermediate FFT result for conducting the particular stage equalizer operation and computing the sliding FFT for the next stage and only storing the final result.

4. The system of claim 1 wherein the sliding FFT comprises a complex multiplier and a complex accumulator and the equalizer block comprises a real to complex multiplier and a complex accumulator whereby for each tone, each block recursively calculates v times to achieve final equalizer output for each tone and repeats the same procedure for each tone.

5. A method of providing an improved equalization for DMT based modem receiver comprising the steps of:
- processing samples from the analog front end by a time domain equalizer;
- transferring samples of every DMT frame from the time domain equalizer to Fast Fourier Transform (FFT) buffer;
- computing differences of time domain samples for every frame into the FFT buffer and saving the results in the FFT buffer;
- calculating a first FFT required for computing a sliding FFT and saving the results in the FFT buffer so that at each DMT frame, after a difference and FFT operation, the FFT buffer contains the first FFT and v−1 time domain sample differences;
- computing sliding FFT and per tone equalizer operation wherein for each tone, sliding FFT block reads the first FFT result and v−1 FFTs from FFT buffer and recursively computes the rest of the v−1 FFTs for the particular tone; and
- providing new results after each iteration to an equalizer that computes equalizer output.

6. The method of claim 5 wherein said equalizer recursively computes the equalizer output and writes the final outputs to the FFT buffer.

7. The method of claim 6 wherein said sliding FFT and equalizer repeats the computing FFT operation and per tone equalization for all tones that carry bits and only using each intermediate FFT result for conducting the particular stage equalizer operation and computing the sliding FFT for the next stage and only storing the final result.

8. The method of claim 5 wherein the sliding FFT comprises a complex multiplier and a complex accumulator and the equalizer block comprises a real to complex multiplier and a complex accumulator whereby for each tone, each block recursively calculates v times to achieve final equalizer output for each tone and repeats the same procedure for each tone.

* * * * *